United States Patent [19]
Konig et al.

[11] Patent Number: 5,569,315
[45] Date of Patent: Oct. 29, 1996

[54] PROCESS AND DEVICE FOR CLEANING THE WASTE AIR OF SYSTEMS FOR THE SOLIDIFICATION OF MELTS

[75] Inventors: Axel König, Stuttgart; Herbert Würmseher, Meitingen; Matthias Kleinhans, Waiblingen-Hegnach, all of Germany

[73] Assignee: Santrade Ltd., Lucerne, Switzerland

[21] Appl. No.: 381,964

[22] PCT Filed: Jun. 28, 1994

[86] PCT No.: PCT/EP94/02094

§ 371 Date: Mar. 31, 1995

§ 102(e) Date: Mar. 31, 1995

[87] PCT Pub. No.: WO95/01858

PCT Pub. Date: Jan. 19, 1995

[30] Foreign Application Priority Data

Jul. 7, 1993 [DE] Germany .......................... 43 22 628.0

[51] Int. Cl.⁶ ...................................................... B01D 9/00
[52] U.S. Cl. .................. 95/290; 55/269; 55/289; 55/290; 55/296; 55/353; 55/446; 96/190; 96/199; 425/74; 425/75; 454/61
[58] Field of Search ................................ 55/269, 289, 290, 55/296, 297, 325, 328, 353, 385.1, 385.4, 422, 446; 95/268, 272, 290, 257; 96/190, 199, 207; 425/73, 74, 75; 454/56, 53, 61, 62

[56] References Cited

U.S. PATENT DOCUMENTS

| | | | |
|---|---|---|---|
| 700,858 | 5/1902 | Thomas | 55/353 |
| 709,763 | 9/1902 | Grumbacher | 55/269 |
| 851,520 | 4/1907 | Johnson | 55/269 |
| 997,762 | 7/1911 | Derrig | 55/269 |
| 2,271,401 | 1/1942 | Sainty | 55/353 |
| 2,925,144 | 2/1960 | Kroll | 55/422 |
| 3,100,106 | 8/1963 | Bielenberg et al. . | |
| 3,396,952 | 8/1968 | Jennrich et al. . | |
| 3,609,943 | 10/1971 | Richter | 55/269 |
| 3,892,550 | 7/1975 | Riis | 55/446 |
| 4,242,111 | 12/1980 | Arends et al. | 55/269 |
| 4,249,921 | 2/1981 | Lell et al. | 55/269 |
| 4,705,467 | 11/1987 | Bakker . | |
| 4,863,645 | 9/1989 | Harbolt et al. . | |
| 5,378,132 | 1/1995 | Kaiser | 425/74 |

FOREIGN PATENT DOCUMENTS 1257219 7/1989 Canada .

OTHER PUBLICATIONS

2029 Chemical Engineering, vol. 90, No. 2 (Jan. 21, 1983), pp. 55, 57.

Primary Examiner—C. Scott Bushey
Attorney, Agent, or Firm—Burns, Doane, Swecker & Mathis, L.L.P.

[57] ABSTRACT

A melt is converted into pieces by being converted to individual quantities that are dropped onto a cooling surface. Disposed above the cooling surface is a hood having a suction outlet for conducting waste air to a cleaner. Disposed in the hood upstream of the suction outlet is an arrangement of surfaces defining a serpentine flow path for the waste air so that a vaporous component of the waste air crystallizes on the surfaces. The surfaces are formed by plates mounted on a common transport carrier which periodically moves the plates against a scraper for scraping off the crystallized material. Alternately, the surfaces can be defined by endless belts which move against scrapers.

19 Claims, 4 Drawing Sheets

1

PROCESS AND DEVICE FOR CLEANING THE WASTE AIR OF SYSTEMS FOR THE SOLIDIFICATION OF MELTS

BACKGROUND OF THE INVENTION

The invention relates to a process and a device that accommodate cleaning the waste air of systems that accommodate the solidification of melts, which melts are deposited on cooling surfaces, in particular a cooling conveyor and harden there, especially systems for solidifying sulfur.

It is well-known that a series of products, such as resins, adhesives, or the like, but also sulfur can be made transportable and handlable by melting them and depositing them either in strips or in the form of drops on a moved cooling belt, where the melt hardens. If said melt is deposited as drops, the result at the end of the cooling belt is a granulate that can be packaged. If deposited as strips, said strips break into pieces and can also be packaged.

Since vapors, which can be environmentally endangering, are produced when the melt is deposited, in particular in the case of sulfur, it is customary to use suction devices which ensure that the resulting waste air is removed and cleaned in a defined manner. The cleaning is done with the aid of filters, which are relatively expensive. There is also the specific drawback with the known cleaning process that the amount of dust that is removed with the waste air is lost to the production of the product.

SUMMARY OF THE INVENTION

The invention is based on the problem of designing a process and a device of the aforementioned kind in such a manner that a smaller amount of the product gets into the waste air so that the burden is taken off of the cleaning process that takes place there.

To solve this problem, the process of the invention proposes that a portion of the product produced as vapor behind the feed point of the melt is removed by crystallization prior to the removal of the waste air and is removed as a solid component. With this measure it is possible to avoid a large portion of the by-product that is produced otherwise as dust and under some circumstances to use the crystallized output again for processing the melt. In so doing, in an improvement of the inventive idea the size of the crystallization surfaces provided for the crystallization process are adapted to the vapor pressure profile over the product, so that where higher vapor pressure prevails, there is also the possibility of depositing larger quantities of the product in the form of crystals on the surfaces.

To implement the new process, a device with a suction hood, which is arranged over a cooling belt and which covers a feeder for the melt and exhibits a suction fitting, can be provided. In the region between the feeder and the suction fitting the hood is provided with installations, which project into the waste air flow and are intended for the crystallation of the product and in the region of the installations said hood is provided with regulatable openings for producing a specific air flow. This design allows the flow rate of the waste air in the region of the installations to be chosen in such a manner that there is adequate time for the crystallization at the installations. At the same time the installations can be designed in an especially simple manner as walls that are arranged in the manner of a labyrinth at right angles to the waste air flow. Therefore, the waste air flow is forced to flow along the walls and in particular at a defined velocity, so that the desired crystallation occurs. To promote the crystallization process, the walls can also be made of heat conductive material and provided with channels for the passage of a thermostatable heat exchange medium or, whose temperature can be stabilized in some other manner. In this manner it is possible to design the temperature of the crystallization surfaces in such a manner that the conditions are optimal for crystallization.

To achieve an adaptation to the vapor pressure profile over the product, the walls can be parallel and at different intervals in the direction of flow; said intervals being adapted to the vapor pressure profile over the product. The walls can project vertically beyond the hood cover into the flow. They can also project horizontally from the opposite side walls of the hood into the flow and in particular in such a manner that opposing flow gaps, which result in flow circumventing the walls serving as the crystallization surfaces, are designed along the line of a labyrinth.

To remove at specific intervals the product that has crystallized on the walls, it is advantageous to attach the walls rigidly to transport elements, which enable the walls to be moved sideways out of the hood, whereby the walls exhibit adapted stripping openings in the region of the side walls of the hood, from which the crystallisate can be scraped. The walls can be pulled out by hand or also automatically at specific time intervals, e.g. by means of pneumatic or hydraulic cylinders or also by means of drive motors for the purpose of cleaning. In any case the construction is designed in such a manner that the crystallization surfaces of the walls are not thoroughly cleaned, in order to leave crystal nuclei, which promote the crystallization at the renewed startup. An especially simple possibility of the configuration of the walls results when the walls themselves form transport elements and are designed as one belt or several infinite belts, which traverse the hood at right angles to the direction of flow and traverse at the side walls of the hood the stripping slots and the slots between the tempering plates, which in turn provide for a tempering of the continuous belts, which form the crystallization surfaces. The circumferential speed can be chosen to match, so that a continuous cycling is possible. Naturally it would also be possible to move the belts discontinuously. In any case there is the possibility of collecting and removing the crystallizate that is scraped off. For example, it can be fed again to the processing of the melt for product manufacturing. With this design it is possible to avoid from the start a significant amount of dust content in the waste air. Thus, the cleaning systems for the waste air can be unburdened.

BRIEF DESCRIPTION OF THE DRAWINGS

The invention is depicted in the drawing and is explained in the following with reference to embodiments.

DETAILED DESCRIPTION OF PREFERRED EMBODIMENTS OF THE INVENTION

Figure 1:
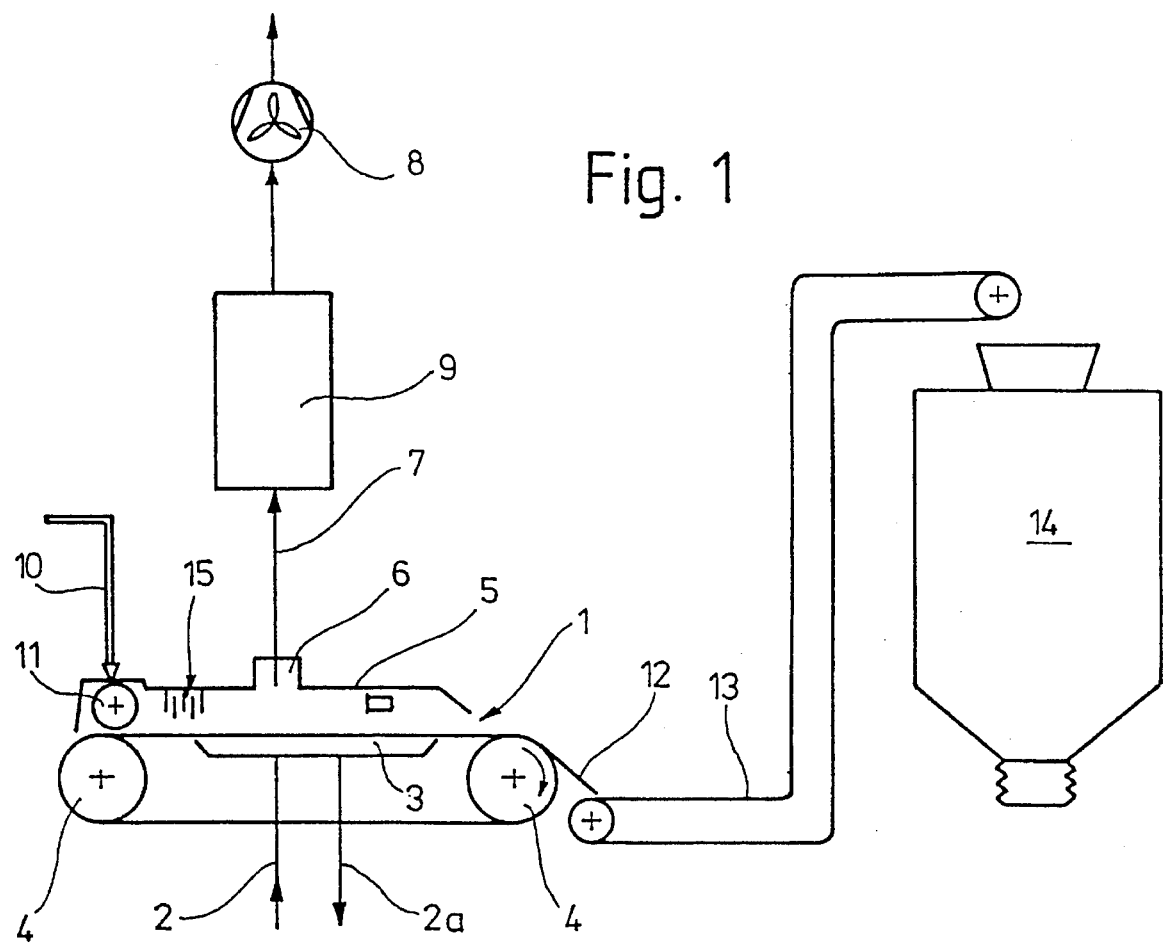
FIG. 1 is a schematic drawing of an apparatus for the production of granulated material from a melt, including a waste air suction device.

FIG. 1 depicts, first of all, quite generally a system, in which a melt, for example molten sulfur, can be processed into pellets. For this purpose the system according to FIG. 1 has a cooling belt (1). Coolant is fed through a line (2) into a chamber (3), below a carrying run or flight of the cooling belt (1) and is sprayed, for example, using spraying nozzles, against the side of the cooling belt (1) which is designed as a steel strip. The coolant is recycled by means of a drain line (2a).

The cooling belt (1) is guided around two deflecting rollers (4) and runs clockwise in the embodiment. Above the carrying run of the belt there is a suction hood (5), which exhibits a suction fitting (6) attached, as shown only schematically, via a suction line (7) to a suction fan (8), to which a cleaning filter (9) or the like is also connected in series in the embodiment.

Molten sulfur is fed through the feed line (10) to a well-known rotor former (11), which comprises in essence two telescoped pipes, of which the inner pipe, which is tempered and filled with melt exhibits a downwardly oriented slot, and the outer pipe is provided with openings over its entire circumference. In the embodiment the outer pipe rotates counterclockwise around the inner pipe; and thus the sulfur melt is deposited in the shape of drops on the upper side of the cooling belt (1), so that the drops can harden there into solid pellets. At the end of the cooling belt (1) these pellets are conveyed over a slide (12) onto a belt (13), which is shown only schematically. By means of the belt (13) the pellets move into a collecting tank (14) and can be put there into commercial packagings. This process has the basic advantage that the sulfur already exists as pellets and does not have to be broken out first from a thoroughly hardened layer into a pourable product, as is also well-known. In such a process the breaking of the sulfur cakes generates a significant amount of dust, which is to be avoided from an environmental point of view.

As the molten sulfur is deposited by means of the rotor former (11) on the cooling belt (1), however, a vaporous sulfur, which appears as sulfur dust in the region below the hood (5) due to the subsequent cooling, is also produced. The essence of the invention is to avoid the creation of this sulfur dust, which is extracted through the fitting (6) and has to be removed from the waste air in the filter (9).

Figure 2:
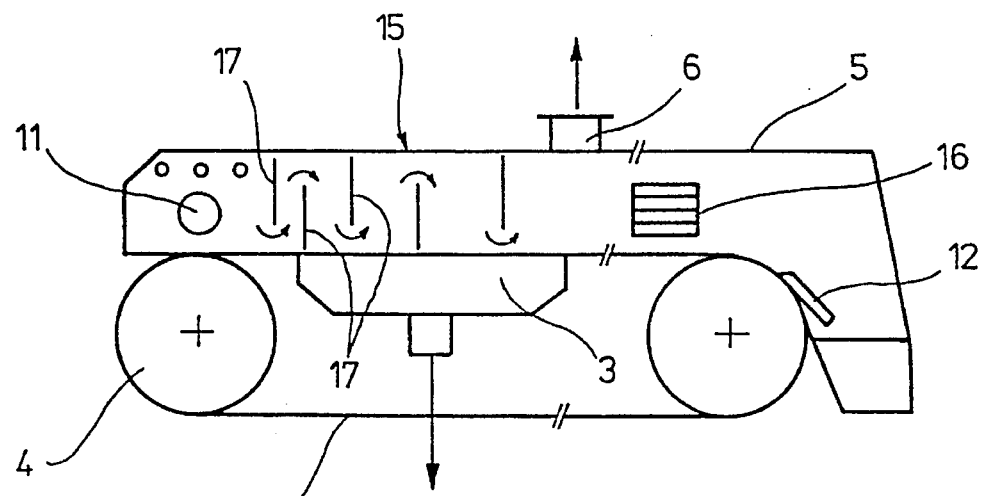
FIG. 2 depicts a section of the device of FIG. 1 with a revolving cooling belt, a feeder for the melt and the crystallization surfaces according to the invention.

According to the invention, the hood (5)—which will be explained in detail with reference to FIGS. 2 and the following Figures—is provided in the region between the rotor former (11) and the fitting (6) with installations (15), which are disposed within the flow generated by the suction fan, above the cooling belt (1). Each installation (15) comprises labyrinthine baffle plates 17 for conducting the flow; said baffle plates force the flow to flow in a serpentine path to the fitting (6). In addition, the hood (5) is provided, on the other side of the fitting (6), with openings (16), whose cross section can be regulated. The openings (16) serve to divide the amount of waste air, which is conveyed from the fan (8) through the fitting (6), in a specific and controlled manner into an amount coming from the right and left sides of the hood (5) and into an amount coming from that section of the hood (5) that lies to the right of the fitting (6). Thus, with this measure it is possible to control the flow rate of the waste air in the section lying between fitting (6) and rotor former (11). This means, that the flow rate of the waste air in the region of the installations (15) can be adjusted by suitably regulating the size of openings (16).

Figure 3:
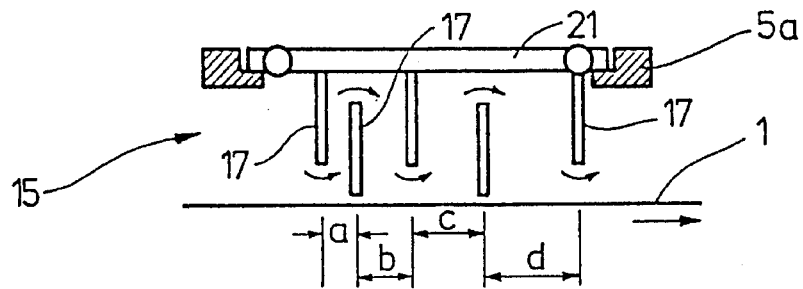
FIG. 3 is an enlarged detail of a first embodiment of the crystallization walls of the device of FIG. 2.
Figure 4:
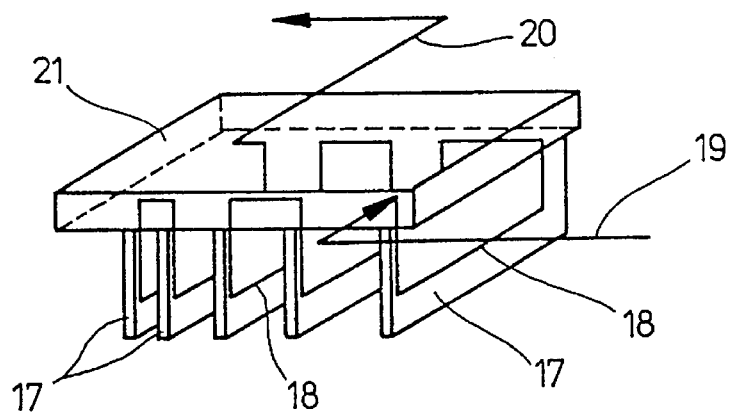
FIG. 4 is a perspective drawing of a modification of the crystallization walls of FIG. 3.
Figure 5:
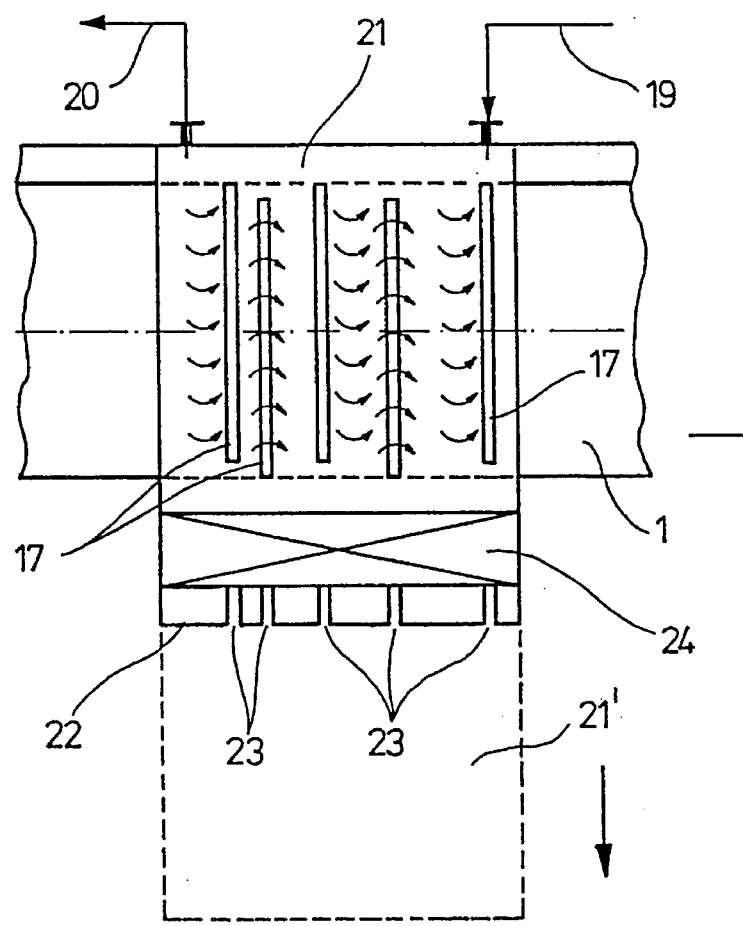
FIG. 5 is a top view of a section of the hood of the device of FIG. 2 and the respective crystallization walls.

FIGS. 3 to 5 depict a first example of the installations, which are used in the hood (5) to enable one portion of the product, which is produced as vapor behind the feed point (rotor former (11)) of the melt, to crystallize out while allowing the removal of the waste air. FIGS. 3 and 4 show that in a first embodiment for this purpose the hood (5) has installations in the form of parallel, flat walls (17), whose mutual spacings a–d in the travelling direction of the cooling belt (1) becomes increasingly larger. Between the first two walls (17), which are formed as plates, there is the distance (a); between the next two walls the distance (b), then the distance (c) and finally the distance (d). These continuously increasing distances are adapted to the vapor pressure profile over the product, which is located on the cooling belt (1). Thus, the goal is reached that the surfaces of the walls (17) in the region of the high vapor pressure have a larger total cross-sectional area than in the region of the lower vapor pressure. If at this stage care is taken that the flow rate of the waste air is chosen to match, as aforementioned, then the sulfur will crystallize on the surfaces of the plates (17). For this purpose, as shown in FIG. 4, the plates (17) can also be provided with channels (18), to which a coolant is fed externally through the line (19) and drained again through the line (20). If the plates (17) are made of heat conductive material, then their surface can be tempered. Naturally it is also possible to temper the plates (17) in a different manner, e.g. externally by means of heat conduction. The temperature can be chosen in such a manner that the crystallization process can take place as optimally as possible. Therefore, the invention provides the possibility of letting the bulk of the sulfur, produced as vapor behind the rotor former through the delivery of melt, crystallize out on the surfaces of the plates (17), so that this vaporous sulfur does not become dust due to subsequent cooling and, therefore, does not get into the filter (9). Rather it remains first in the crystallized state on the surfaces of the plates (17) and has to be removed from there from time to time.

For this purpose a first embodiment according to FIG. 5 (and 3 and 4) provides that the plates (17) are attached all together to a carrier plate (21), which can be slid at right angles to the travelling direction of the cooling belt (1) in the hood on corresponding guides (5a), which are integrated (in a manner that is not illustrated in detail) into the cover of the hood (5), into the end position (21'), shown in FIG. 5). The device is designed in such a manner that a stripping wall (22) with slots (23) is attached to the hood (5) at the side of the cooling belt (1). The size and mutual distance of said stripping wall is adapted to the condition and to the dimensions of the plates (17). In front of the stripping plate (22) there is a chamber (24), which can also be designed as a separate suction chamber. If, therefore, the plate (21) is pulled (e.g., manually) with the plates (17) attached thereto into its position (21') outside the hood (5), then the cystalline sulfur, adhering to the surface of the plates (17) is scraped from the slots (23) and falls into the chamber (24). From there it can be removed and conveyed, for example, to the processing device for the sulfur melt. The slots (23) serve to strip and scrap off the crystalline sulfur. However, they clean the surfaces of the plates (17) in such manner that the crystal nuclei still remain on the surfaces. When the plates (21) are pushed back again and when the plates (17) are reconfigured in the flow path, said crystal nuclei ensure that the sulfur vapor will continue to crystallize out.

Figure 6:
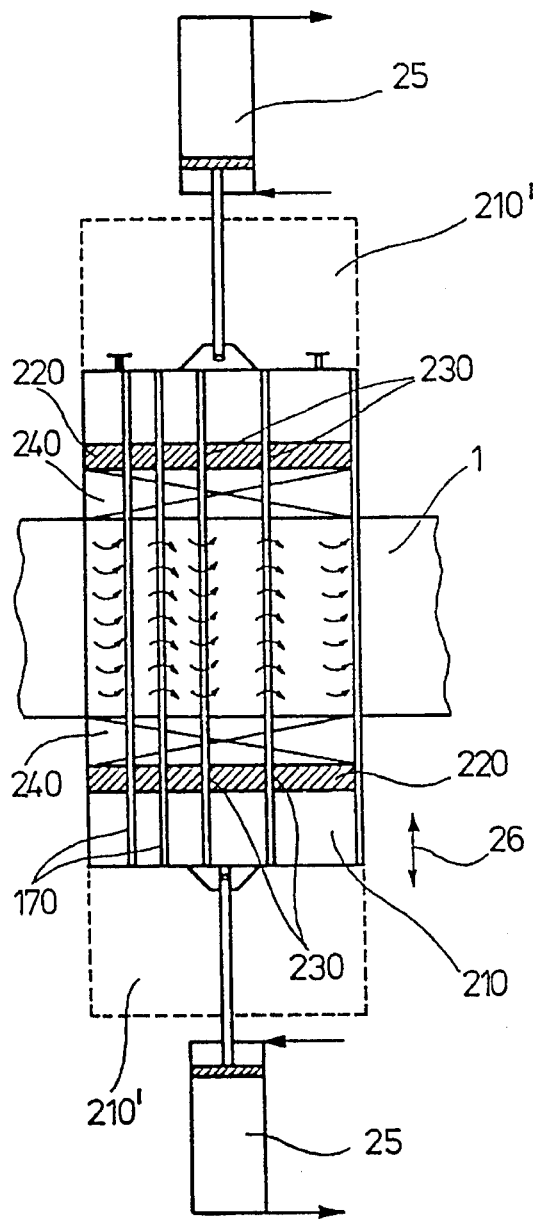
FIG. 6 is a drawing similar to FIG. 5 of an embodiment having crystallization walls which can be moved sideways out of the hood.

FIG. 6 shows a variation of the embodiment of FIGS. 3 to 5, insofar as here the plates (170), which can be arranged, moreover, in the same manner as the plates (17) of the embodiment of FIGS. 3 to 5, are attached to a common plate (210), which is significantly wider than the hood, whose side boundaries terminate in the side edges of the cooling belt (1). In this embodiment the plates (170) are guided in slots (230) in two side plates (220), which are arranged parallel to both the outer edges of the cooling belt (1) and the side walls of the hood. In this case, too, there are collecting chambers (240) within the guide plates (220), which can serve to hold the sulfur scraped off the slots (230).

The plates (170), guided in the slots (230) on both sides in this embodiment, are attached to a common plate (210); and this plate (210) can be slid back and forth in the direction of the arrows (26) by means of pneumatic cylinders (25), which are mounted on both sides, in such a manner that said plate protrudes to one side around the dashed region (210'). In this position a section of the surfaces of the plates (170), located in the waste air stream within the hood (5), can be scraped off and cleaned, as described in connection with FIGS. 3 to 5. The movement in the direction of the arrows (26) can take place intermittently automatically at specific intervals. A continuous back and forth movement, which would have to occur at corresponding rates, would also be possible.

Figure 7:
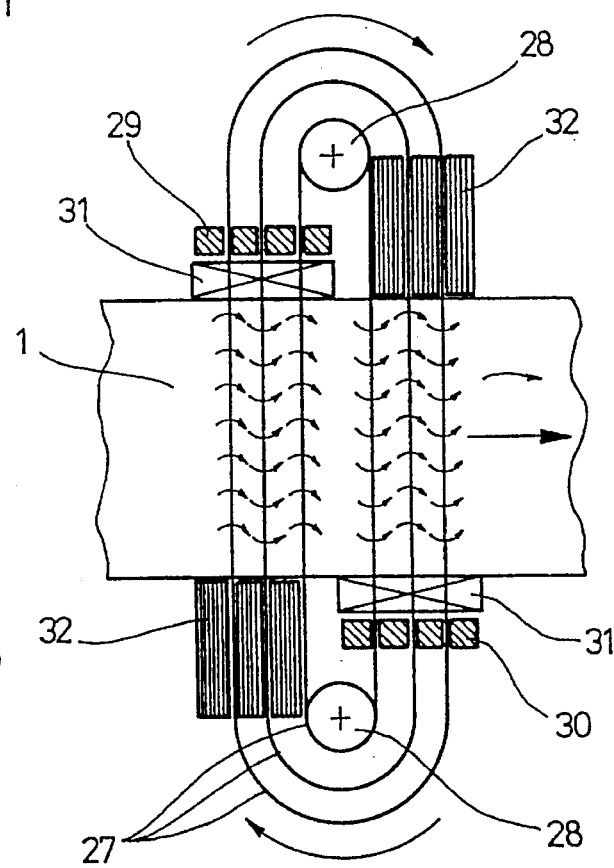
FIG. 7 depicts an embodiment of a device wherein the crystallization walls are designed directly as belts traversing the hood.

FIG. 7 shows another embodiment. Here, instead of the plates being attached rigidly to a carrier, three revolving endless belts (27) are provided as the crystallization surfaces. Said belts are guided on respective reflecting rollers (28) at right angles to the travelling direction of the cooling belt (1). Furthermore, the belts (27) have to travel within the chamber in the suction hood (5) (not illustrated) and, therefore, must be designed in such a manner that the course of the belt, shown in FIG. 3, is also labyrinthine between the individual belts, said course forcing the waste air flow to flow from the bottom to the top and again from the top to the bottom through the baffles, formed then by the belts (27). The belts (27) leave the hood through plates (29) on the one side and plates (30) on the other side, to which collecting chambers (31) are assigned on the side facing the cooling belt (1). These plates (29 and 30) contain the scrap-off slots, which exert the same function as the slots (23 or 230) of the designs described above. In addition, the revolving belts (27) also have cooling plates (32) upstream of the entry into the interior of the suction hood. Said plates are designed in such a manner that the belts are guided in slotted openings and, in so doing, make thermal contact with the cooling plates (32). In this manner, too, it is possible to temper in such a manner the continuously revolving belts, which can be, for example, metal belts that the desired crystallization process is optimal.

Figure 8:
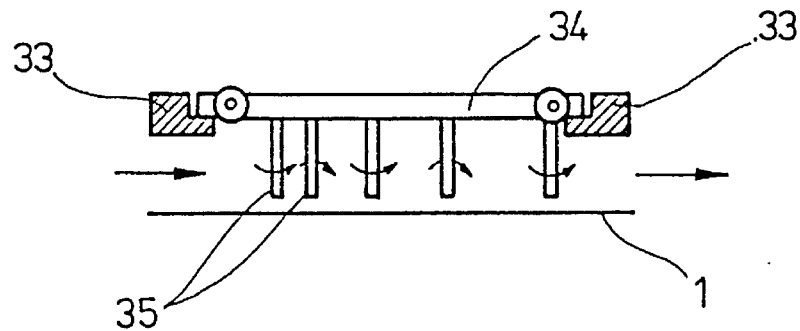
FIG. 8 is a drawing similar to FIG. 3, but with crystallization walls, which project sideways beyond the walls of the hood and are offset in the interior of said hood.
Figure 9:
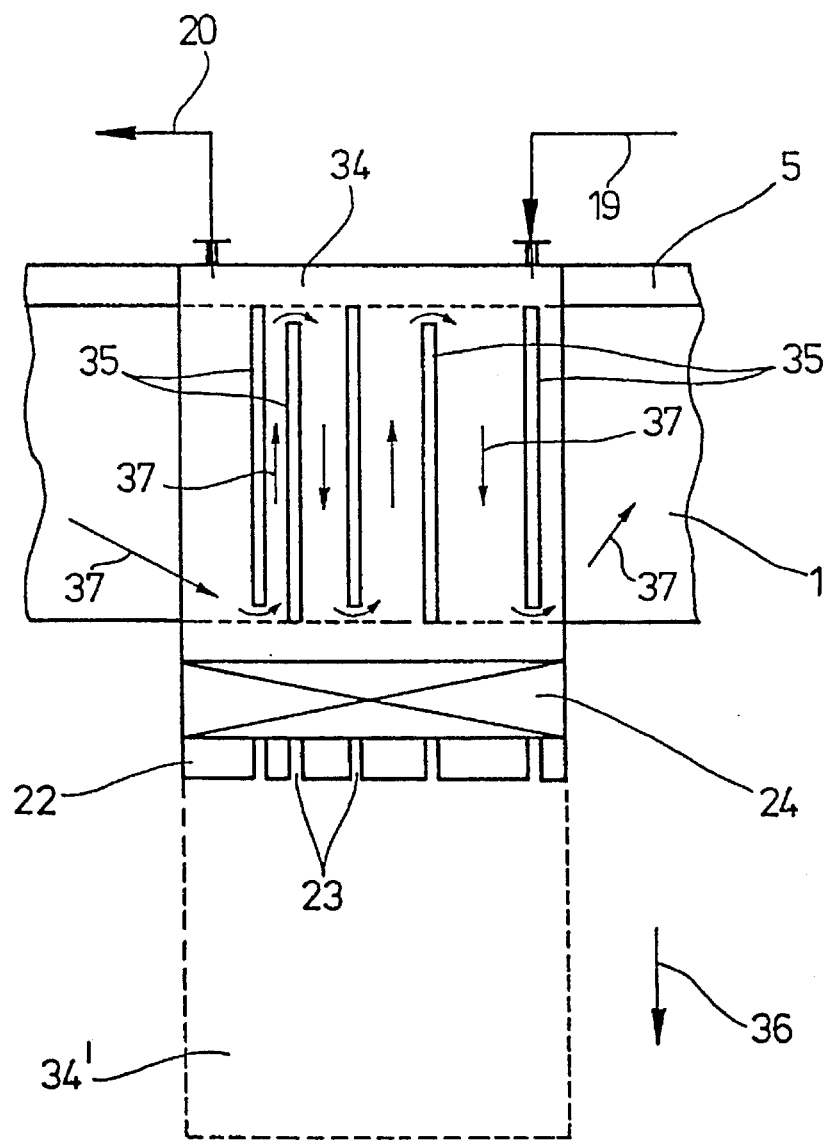
FIG. 9 is a top view similar to FIG. 5 of the embodiment of FIG. 8.

Finally FIGS. 8 and 9 show a variation of the plates (35), projecting into the waste air flow, insofar as here the plates (35) are also attached to a common plate (34), which can be removed from the hood (5) in the direction of the arrow (36), but in such a manner that the labyrinthine gaps for the flow are not formed at the top and the bottom of the plate, but rather on offset sides of the plates (35). It is apparent that the waste air flow is forced here to escape to the side in the direction of the arrows (37), and then flows parallel to the plates (35) to reach the next side in order to eventually leave the labyrinth through the suction fitting. Of course, such an arrangement can also be used in an advantageous manner for crystallizing sulfur vapor. In this case the flow paths of the waste gas between the plates (35) are elongated, so that the sulfur vapor has adequate time to crystallize. The mutual distance between the plates matches that of FIG. 3. Moreover, a stripping plate (22) is also provided here, as in the embodiment of FIG. 5; and the plates (35) can be stripped of the crystalline sulfur, adhering to their surfaces, when their transport plate (34) is pulled in the direction of the arrow (36). Said sulfur then falls into the collecting chamber (24).

We claim:

1. A process for cleaning waste air generated during the solidification of a molten material comprising the steps of:
   A) converting the molten material into individual quantities which are positioned on a cooling surface for solidification;
   B) collecting, in a space formed above the cooling surface, waste air which contains a vaporous component emanating from the material;
   C) conducting the collected waste air from the space to a cleaner; and
   D) causing at least some of the vaporous component to crystallize on surfaces located within the space prior to step C.

2. The process according to claim 1, wherein step D comprises passing the waste air across the surfaces of plates within the space.

3. The process according to claim 2, wherein step D comprises conducting the waste air in a serpentine travel path defined by said plates.

4. The process according to claim 2 further including the step of periodically scraping crystallized material from said plates.

5. The process according to claim 2, wherein step D comprises providing a greater concentration of said plates in a region of the space where the pressure of the vapor component is greatest.

6. The process according to claim 1, wherein said space is formed by a hood overlying said cooling surface, said hood providing an outlet communicating with said space, step C comprising conducting said collected waste air through said outlet; and step D comprising causing said vaporous component to crystallize on surfaces located within said hood.

7. Apparatus for cleaning waste air generated during the solidification of molten material, comprising:
   means for converting the molten material into pieces;
   a cooling belt for receiving the pieces and allowing the pieces to solidify;
   a hood overlying said belt and including a suction outlet for collecting waste air which contains a vaporous component emanating from the material, said hood communicating with a cleaner for conducting the waste air to the cleaner; and
   an arrangement of surfaces disposed within said hood upstream of said suction outlet and against which said waste air flows so that at least some of the vaporous component crystallizes on said surfaces.

8. The apparatus according to claim 7, wherein said surfaces are defined by plates arranged to define a serpentine flow path for the waste air.

9. The apparatus according to claim 8, wherein said serpentine flow path includes alternating upward and downward flow path segments.

10. The apparatus according to claim 7, wherein said serpentine flow path comprises horizontal flow path segments traveling alternately in different horizontal directions.

11. The apparatus according to claim 7, wherein said surfaces are heat tempered.

12. The apparatus according to claim 7, wherein said surfaces are formed of a heat-conductive material and carry conduits for conducting a heat exchange fluid to cool the surfaces.

13. The apparatus according to claim 7, wherein there is a greater concentration of said surfaces at a region of highest pressure of said vaporous component.

14. The apparatus according to claim 13, wherein a spacing between successive surfaces is shortest in said region of highest pressure.

15. The apparatus according to claim 7 including a transport device to which said surfaces are mounted, said transport device arranged to conduct said surfaces across scrapers for scraping crystallized material from said surfaces.

16. The apparatus according to claim 7, wherein said surfaces are defined by movable endless belts arranged to move across scrapers for scraping crystallized material from said surfaces.

17. The apparatus according to claim 7, wherein said hood includes air holes of regulatable dimension for controlling a rate of waste air flow through said suction outlet.

18. Apparatus for the solidification of molten material, comprising:

means for converting a molten material into pieces;

a cooling belt for receiving the pieces and allowing the pieces to solidify;

a hood overlying said belt and including a suction outlet for conducting waste air to a cleaner; and an arrangement of surfaces projecting downwardly from an underside of said hood, said surfaces disposed above said belt and upstream of said suction outlet and against which said waste air flows so that a vaporous component of said material crystallizes on said surfaces.

19. Apparatus for the solidification of molten material, comprising:

means for converting a molten material into pieces;

a cooling belt for receiving the pieces and allowing the pieces to solidify;

a hood overlying said belt and including a suction outlet for conducting waste air to a cleaner; and an arrangement of surfaces projecting horizontally from opposite sides of said hood, said surfaces disposed above said belt and upstream of said suction outlet and against which said waste air flows so that a vaporous component of said material crystallizes on said surfaces.

* * * * *